Aug. 17, 1965 D. M. SHARP 3,201,696

RADIO RECEIVERS

Filed May 29, 1962

INVENTOR.
DOUGLAS M. SHARP

BY Alfred C. Hill

AGENT 3,201,696
RADIO RECEIVERS
Douglas M. Sharp, Wyckoff, N.J., assignor to International Telephone and Telegraph Corporation, Nutley, N.J., a corporation of Maryland
Filed May 29, 1962, Ser. No. 198,628
22 Claims. (Cl. 325—423)

This invention relates to radio receivers and more particularly to a self-tuning radio receiver.

There are two types of radio receivers presently known in the art capable of being swept through a given frequency range. The first type of receiver includes an arrangement to sweep the tuning circuit or circuits of the receiver through a frequency range with no change in sweep speed as the receiver responds to transmitted signals. The second type of receiver, called a signal seeking receiver, utilizes mechanical or electronic arrangements to sweep the tuning circuit or circuits of the receiver through a frequency range and lock on each and every signal received exceeding a preselected threshold level until released manually.

The prior art receivers described hereinabove have certain disadvantages. The first type of receiver is incapable of permitting identification of the material being carried by the received signal while the second type of receiver requires the manual reset after reception of a signal before the receiver will continue its sweep to the next signal. This latter arrangement, whether mechanical or electronic, presents a safety hazard particularly during mobile operation where an operator must manually reset the sweep operation. It would of course, be possible to provide a foot-button for the driver of the vehicle carrying the mobile receiver but this tends to complicate the radio receiver and, of course, increases the cost of such a receiver.

An object of this invention is to provide a receiver capable of being swept over a frequency range eliminating the disadvantages of the above-mentioned prior art arrangements.

Another object of this invention is to provide a simple circuit arrangement easily incorporated in a conventional receiver rendering the receiver self-tuning and enabling an operator to lock the frequency of the receiver to the frequency of a received signal to which he desires to listen.

A feature of this invention is the provision of a radio receiver comprising a signal channel capable of being tuned through a given frequency range having incorporated therewith a means to periodically tune the signal channel through the frequency range at a given rate and means responsive to the received signals to cause the tuning means to hesitate for a short period of time each time a signal is receivd to permit identification of the material carried by the received signal.

Another feature of this invention is the provision of a means operable to lock the frequency of the signal channel to the frequency of a selected signal including a push-button actuated by the operator and a means responsive to the selected signal to lock the frequency of the signal channel to the frequency of the selected signal automatically.

Still another feature of this invention is the provision of a sweep circuit having its output voltage coupled to a voltage variable device included in the tuning circuit of the radio receiver to accomplish the periodic tuning of the receiver through the given frequency range at the desired rapid sweep rate, and a signal detector responsive to received signals to produce an output signal operable upon the sweep circuit to reduce the given sweep rate momentarily to permit identification of the material carried by each of the received signals.

The above-mentioned and other features and objects of this invention will become more apparent by reference to the following description taken in conjunction with the accompanying drawings, in which.

Figures 1, 2, 3, 4:
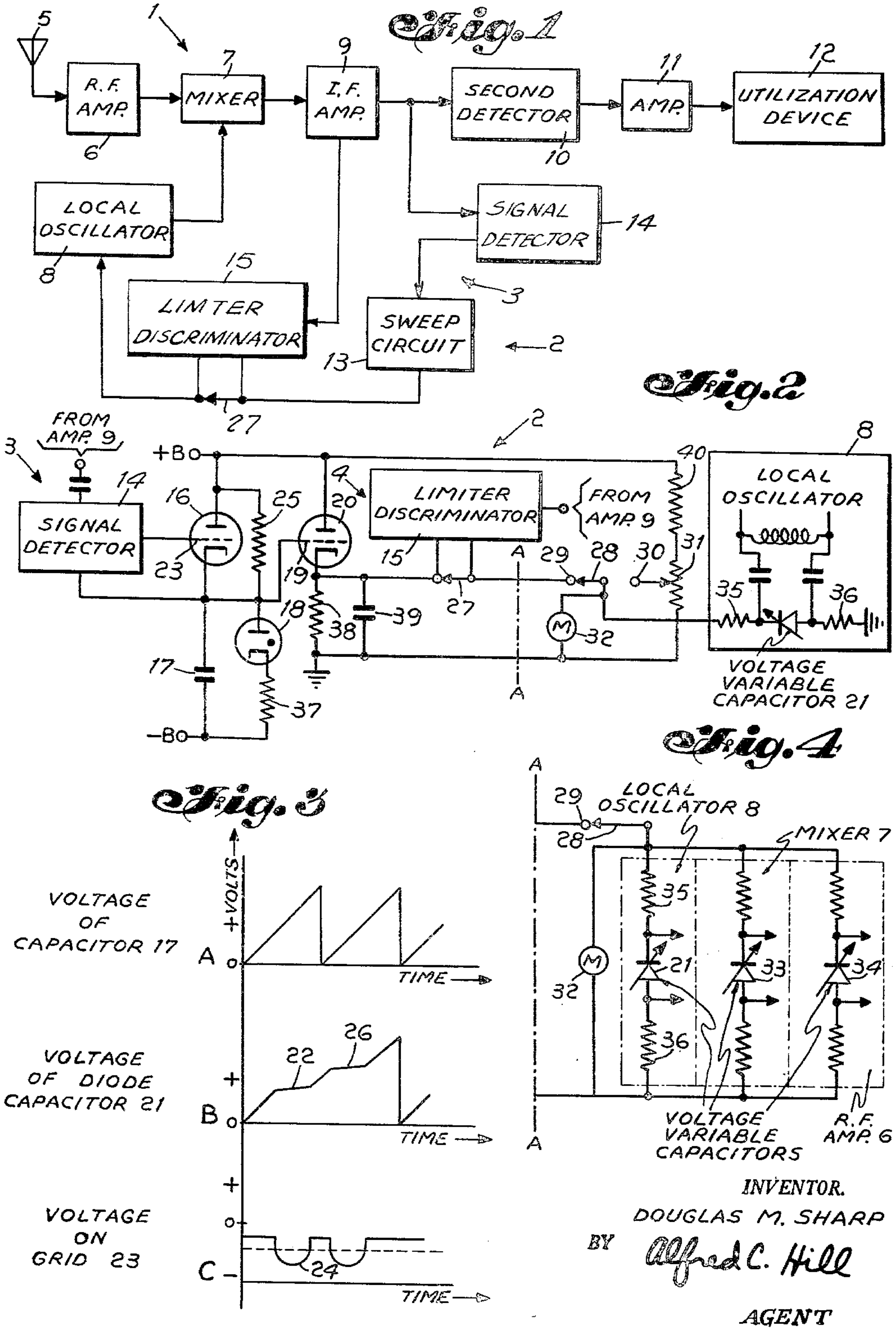
FIG. 1 is a schematic diagram in block form of a radio receiver in accordance with the principles of this invention.
FIG. 2 is a schematic diagram illustrating an embodiment of the sweep circuit of FIG. 1.
FIG. 3 illustrates a series of curves useful in explaining the opration of the circuit of FIG. 2.
FIG. 4 is a schematic illustration which may be substituted for the circuit components to the right of line A—A of FIG. 2.

Referring to FIGS. 1 and 2, the radio receiver in accordance with the principles of this invention includes signal channel 1 capable of being tuned through a given frequency range, means 2 to periodically tune channel 1 through the given frequency range at a given rate, means 3 responsive to received signals to cause means 2 to hesitate for a short period of time each time a signal is received. Incorporated with the above-described arrangement is means 4 operable to lock the frequency of channel 1 to the frequency of a selected signal.

Referring to FIG. 1, the radio receiver of this invention more specifically includes an antenna 5 to intercept transmitted radio waves for coupling to a radio frequency (RF) amplifier 6 envisioned for the purpose of the discussion to follow to be a broadband amplifier capable of receiving the given frequency range through which the receiver can be tuned. The output of amplifier 6 is coupled to a conventional mixer 7 which through the cooperation of local oscillator 8 produces an intermediate frequency (IF) signal. The IF signal is coupled to a conventional IF amplifier 9 and, hence, to second detector 10 to recover the baseband signal, that is, the intelligence carried by the received signal which may be audio or video in nature. The detected intelligence at the output of detector 10 is coupled to amplifier 11, either an audio or video amplifier as the case may be, and, hence, to utilization device 12 which may, for example, be a loudspeaker. The equipment described is the usual equipment found in radio receivers. The improvement to such a conventional radio receiver is found in the remaining circuit components which could be packaged as a single unit for addition to a conventional radio receiver.

The novel portion of the radio receiver of this invention includes a sweep circuit 13 operating upon local oscillator 8 to rapidly sweep the receiver over a given frequency band at a given rate. In response to a signal intercepted by antenna 5, and as detected by signal detector 14, the sweep circuit 13 will be automatically activated to reduce the sweep speed to a speed slow enough for identification of the intelligence carried by the received signal. Thus, in operation the receiver of this invention would seem to tune itself from station to station, hesitating on each station for a few seconds until the highest frequency of the given frequency range is reached at which point the process repeats itself. Means to be described in greater detail in connection with FIG. 2 and including limiter discriminator 15 permit the locking of any station intercepted by the sweeping process for the purpose of monitoring the signal received for an unlimited period of time.

Referring to FIG. 2, sweep circuit 13 is illustrated in greater detail. The sweep circuit 13 includes electron discharge device or tube 16, preferably a high mu tube, capacitor 17, and gas tube 18 cooperatively connected to provide a relaxation oscillator. With tube 16 conducting, a waveform as illustrated in curve A, FIG. 3 will appear across capacitor 17 and, hence, on grid 19 of electron discharge device or tube 20. Tube 20 is a cathode follower used for coupling the sawtooth waveform of curve A, FIG. 3 to voltage tunable capacitor 21 arranged as the tuning element of the tuned circuit of local oscillator 8. As illustrated, capacitor 21 is coupled across the inductance of the tuned circuit of oscillator 8. It is to be understood that capacitor 21 could be connected in any tuned circuit other than illustrated to control the frequency of the signal generated by oscillator 8.

Voltage variable capacitor 21 is a semiconductor device having particular capacitance characteristics. For instance, capacitor 21 may be a silicon junction diode where at the pn junction the density of charge carriers (electrons in the n regions and holes in the p region) is reduced substantially to zero when a voltage is applied across the junction with the opposite polarity from that causing easy current flow. In other words, the junction of the diode is back biased. As the voltage increases, the region of zero carrier density, known as the depletion region, gets wider. In effect, this moves apart the two conducting areas and decreases the capacity as if there were two metal plates separated by a dielectric whose thickness is variable in accordance with the value of the applied voltage.

For ease of description of the operation of the circuit of FIG. 2, it will be assumed, as mentioned hereinabove, that amplifier 6 is broadbanded and the tuning of local oscillator 8 is all that is necessary for tuning the receiver over the given frequency range. As the voltage across capacitor 21 rises from zero (curve A, FIG. 3) the receiver begins its sweep in frequency by varying the tuning of local oscillator 8. At some point the receiver intercepts a signal. When a signal is intercepted the sweep rate of the receiver is reduced as illustrated by portion 22 of curve B, FIG. 3. The received signal is sensed by signal detector 14, the output of which is connected to the grid 23 of tube 16 with the reference potential of detector 14 being the cathode of tube 16. The signal detected causes a negative voltage on the grid of tube 16 relative to the cathode voltage and, as illustrated by portion 24 of curve C, FIG. 3, is sufficient to cut-off the plate current in tube 16. This rendering of tube 16 nonconductive stops the charging of capacitor 17 except for a very low current which continues through resistor 25. Resistor 25 is a very large resistance which produces an RC product (a time constant) of many times that of the time constant of the path including tube 16 and capacitor 17. Thus, as shown in portion 22, curve B, FIG. 3 the sweep continues through this portion but at a much reduced rate. As soon as the receiver has tuned through the received signal the sweep continues at the rapid or initial rate until the second signal is received, as illustrated by portion 26 of curve B, FIG. 3. The process repeats itself on the second, third, and any number of other signals that may be received within the tuning range of the receiver.

If the signal detected does not have sufficient amplitude to entirely cut-off tube 16, but does have sufficient amplitude to reduce conduction in tube 16, the sweep speed will still be reduced but not to the extent that occurs when tube 16 is cutoff. This is due to the fact that the resistance of tube 16 will increase and the charging path will now be through tube 16 and resistor 25 in parallel.

If the operator is interested in locking on a particular signal for a longer period of time, switch 27 is opened. This connects the output of a conventional frequency discriminator 15 in series with the output of the relaxation oscillator and capacitor 21. Since the total sweep voltage is small compared to the available output of discriminator 15, locking the frequency is possible even though the sweep voltage continues. The receiver will remain on the frequency of the selected signal until discriminator 15 is shorted out by switch 27 or until the selected signal leaves the air. Discriminator 15 functions in the same manner as a discriminator in a conventional automatic frequency control circuit. The signal amplified by intermediate frequency amplifier 9 which is proportional to the difference frequency between the received signal and the local oscillator signal is directly coupled to discriminator 15. This signal is centered in the discriminator. When sweep circuit 13 varies the frequency of local oscillator 8, the intermediate frequency signal amplifier 9 amplifies and transmits a changed difference frequency signal. Discriminator 15 sensing a frequency change from the frequency of the signal it has centered on immediately produces a voltage having an amplitude approximately equal to the amplitude of the voltage produced by the sweep circuit and of opposite polarity. Since the available output of discriminator 15 is large compared to the total sweep of the sweep circuit, the discriminator rapidly pulls the local oscillator back into phase to maintain the quality of the received signal.

If it is desired to monitor a frequency, whether a signal is being received or not, switch 28 can be actuated by the operator to move from contact 29 to contact 30. This action places potentiometer 31 in active association with capacitor 21 and, thus, the operator by varying potentiometer 31 may manually tune the receiver to the desired frequency by appropriately varying the voltage on capacitor 21.

Meter 32 is a voltmeter which may be calibrated in frequency and, thus, will indicate the frequency to which the receiver is tuned when it is sweeping, locked, or in the manual position.

If a narrow-band radio receiver is employed rather than the assumed wide-band receiver referred to in the discussion above, it is necessary to track the tuning of amplifier 6, mixer 7, and oscillator 8. In accordance with this invention, it is possible to carry out the required tracking of the indicated components by employing a voltage tunable capacitor or other voltage tunable devices in the tuned circuits of each of these components. This arrangement is illustrated in FIG. 4 where voltage variable capacitor 21 forms a portion of the tuned circuit of the local oscillator 8, voltage variable capacitor 33 is the tuning element of the tuned circuit of mixer 7, and voltage variable capacitor 34 is the tuning element of the tuned circuit of RF amplifier 6. These voltage variable capacitors are coupled in parallel as illustrated to the cathode of tube 20 through switch 28 and contact 29.

Resistors 35 and 36 are connected to capacitor 21 in FIGS. 2 and 4 and similar resistors are connected to capacitors 33 and 34 in FIG. 4 to isolate the radio frequency energy in the tuned circuit from the direct current voltage applied from the sweep circuit to the voltage variable capacitors. Rather than the resistors, choke elements could be employed.

In this tracking arrangement, the proper separation between the frequencies of local oscillator 8 and amplifier 6 to produce the desired IF signal may be obtained by appropriately tailoring the inductances of the tuned circuits of these circuits. These tailored coils may, of course, be appropriately compensated for by trimmer capacitors. An alternative is to select the voltage variable capacitors to have different voltage-capacitance characteristics. Of course, a combination of these two expediencies could also be employed. In addition, it would be possible to insert a fixed voltage source between the voltage variable capacitors and the output of the cathode follower 20 to select the appropriate starting point for the voltage variable capacitors, that is, the voltage variable capacitors would be biased to a particular point to maintain the desired frequency spread between the local oscillator and RF amplifier frequencies.

As pointed out hereinabove, voltage variable capacitors of the diode type have been employed to provide the desired tuning. These components are capable of tuning frequency bands up to 500 megacycles. At microwave frequencies, that is, frequencies above 500 megacycles, the voltage variable capacitor or capacitors could be replaced by sweep voltage amplifiers which in turn would drive a backward wave oscillator, or, with appropriate difference voltages, a full backward wave converter could be driven and the same results described for the lower frequencies would be obtained.

The following table gives the value of the components employed in a successful reduction to practice of the circuit described in connection with a 144 megacycle radio receiver with a 15 kilocycle IF bandwidth.

| | |
|---|---|
| Tube 16 | ½ 12AX7. |
| Tube 20 | ½ 12AX7. |
| B+ | 150 volts. |
| B− | 110 volts. |
| Capacitor 17 | 100 microfarads. |
| Resistor 25 | 20 megohms. |
| Tube 18 | OB2. |
| Resistor 37 | 330 ohms. |
| Resistor 38 | 33,000 ohms. |
| Capacitor 39 | 2 microfarads. |
| Capacitor 21 | Pacific Semiconductor type V20. |
| Resistor 35 | 4700 ohms. |
| Resistor 36 | 4700 ohms. |
| Potentiometer 31 | 10,000 ohms. |
| Resistor 40 | 75,000 ohms. |

The receiver employing the above components sweeps a four megacycle frequency range in about ten seconds when there are no signals present. When signals are received, the sweep speed is reduced to allow a readable hesitation of about five seconds for each station.

It is, of course, obvious that for other tuning ranges and IF bandwidths, the two sweep speeds may be varied by choosing other component values.

One advantage of the radio receiver of this invention is its electronic nature and the fact that additional circuit components are simple and straightforward and may be packaged as a kit for addition to a standard radio receiver. No motors, vibrators or any other mechanical means are employed in generating the sweep for tuning the receiver through the frequency range. Further, since no high frequency circuits are involved in the selection of the mode of turning, this selection and the manual tuning may be done easily from a remote point. Further advantages of a swept receiver that hesitates but does not lock on a received signal except on command can be seen in considering the case of an entertainment receiver. If a particular type of program material is desired, such as news, the material of many stations may be sampled before a station broadcasting news is reached. Only then is it necessary for the operator to do anything. He pushes a button which operates switch 27 of FIG. 2 which locks the receiver on the station with the news. As pointed out hereinabove, this would have particular advantage, in the interest of safety, during mobile operation.

The receiver of this invention would also have utility in spectrum surveillance receivers where a fast sweep of a particular bandwidth is required but the identification of intelligence carried by the signals intercepted would require more time than that permitted by the sweep time. A hesitation in the sweep, such as a reduction of the speed rate, as described in connection with the receiver of this invention would allow an oscilloscope connected to the output of the receiver to synchronize to the reception rate of the material transmitted rather than to the repetition rate of the sweep.

While I have described above the principles of my invention in connection with specific apparatus, it is to be clearly understood that this description is made only by way of example and not as a limitation to the scope of my invention as set forth in the objects thereof and in the accompanying claims.

I claim:

1. A radio receiver comprising:
a signal channel tuneable through a given frequency range;
means coupled to said channel to periodically tune said channel through said frequency range at a given tuning rate; and
means coupled to said means to tune responsive to received signals to slow down said given rate momentarily to a second tuning rate less than said given rate and greater than zero.

2. A radio receiver comprising:
a signal channel tuneable through a given frequency range;
means coupled to said channel to periodically tune said channel through said frequency range at a given tuning rate;
means coupled to said means to tune responsive to received signals to slow down said given rate momentarily to a second tuning rate less than said given rate and greater than zero; and
means operable to lock the frequency of said channel to the frequency of a selected signal.

3. A radio receiver comprising:
a tuning circuit including a voltage variable device capable of tuning said receiver through a given frequency range;
means coupled to said device to periodically tune said receiver through said frequency range at a given tuning rate; and
means coupled to said means to tune responsive to received signals to slow down said given rate momentarily to the second tuning rate less than said given rate and greater than zero.

4. A radio receiver comprising:
a tuning circuit including a voltage variable device capable of tuning said receiver through a given frequency range;
means coupled to said device to periodically tune said receiver through said frequency range at a given tuning rate;
means coupled to said means to tune responsive to received signals to slow down said given rate momentarily to a second tuning rate less than said given rate and greater than zero;
means operable to disable said means to tune at a selected received signal; and
means coupled to said device responsive to said selected signal to lock the frequency of said tuning circuit to the frequency of said selected signal.

5. A radio receiver comprising:
a tuning circuit including a voltage variable device capable of tuning said receiver through a given frequency range;
means coupled to said device to periodically tune said receiver through said frequency range at a given tuning rate;
means coupled to said means to tune responsive to received signals to slow down said given rate momentarily to a second tuning rate less than said given rate and greater than zero;
means to disconnect said means to tune from said device at a selected received signal; and
a frequency discriminator coupled to said device responsive to said selected signal to lock the frequency of said tuning circuit to the frequency of said selected signal.

6. A radio receiver comprising:
a signal channel capable of being tuned through a given frequency range;
a sweep circuit coupled to said channel to periodically tune said channel through said frequency range at a given sweep rate; and
means coupled to said sweep circuit responsive to received signals to slow down said given sweep rate momentarily to a second sweep rate less than said given sweep rate and greater than zero.

7. A radio receiver comprising:
a signal channel capable of being tuned through a given frequency range;
a sweep circuit coupled to said channel to periodically tune said channel through said frequency range at a given sweep rate;
means coupled to said sweep circuit responsive to received signals to slow down said given sweep rate momentarily to a second sweep rate less than said given sweep rate and greater than zero;
means operable to disable said sweep circuit at a selected received signal; and
means coupled to said channel responsive to said selected signal to lock the frequency of said channel to the frequency of said selected signal.

8. A radio receiver comprising:
a signal channel capable of being tuned through a given frequency range;
a sweep circuit coupled to said channel to periodically tune said channel through said frequency range at a given sweep rate;
means coupled to said sweep circuit responsive to said received signals to slow down said given sweep rate momentarily to a second sweep rate less than said given sweep rate and greater than zero;
means to disconnect said sweep circuit from said channel at a selected received signal; and
a frequency discriminator coupled to said channel responsive to said selected signal to lock the frequency of said channel to the frequency of said selected signal.

9. A radio receiver comprising:
a signal channel capable of being tuned through a given frequency range;
means coupled to said channel to periodically tune said channel through said frequency range at a given tuning rate; and
a signal detector coupled to said means to tune responsive to received signals to slow down said given rate momentarily to a second tuning rate less than said given rate and greater than zero.

10. A radio receiver comprising:
a signal channel capable of being tuned through a given frequency range;
means coupled to said channel to periodically tune said channel through said frequency range at a given tuning rate;
a signal detector coupled to said means to tune responsive to received signals to slow down said given rate momentarily to a second tuning rate less than said given rate and greater than zero;
means operable to disable said means to tune at a selected received signal; and
means coupled to said channel responsive to said selected signal to lock the frequency of said channel to the frequency of said selected signal.

11. A radio receiver comprising:
a signal channel capable of being tuned through a given frequency range;
means coupled to said channel to periodically tune said channel through said frequency range at a given tuning rate;
a signal detector coupled to said means to tune responsive to received signals to slow down said given rate momentarily to a second tuning rate less than said given rate and greater than zero;
means to disconnect said means to tune from said channel at a selected received signal; and
a frequency discriminator coupled to said channel responsive to said selected signal to lock the frequency of said channel to the frequency of said selected signal.

12. A radio receiver comprising:
a tuning circuit including a voltage variable device capable of tuning said receiver through a given frequency range;
a sweep circuit coupled to said device to periodically tune said receiver through said frequency range at a given sweep rate; and
a signal detector coupled to said sweep circuit responsive to received signals to slow down said given sweep rate momentarily to a second sweep rate less than said given sweep rate and greater than zero.

13. A radio receiver comprising:
a tuning circuit including a voltage variable device capable of tuning said receiver through a given frequency range;
a sweep circuit coupled to said device to periodically tune said receiver through said frequency range at a given sweep rate;
a signal detector coupled to said sweep circuit responsive to received signals to slow down said given sweep rate momentarily to a second sweep rate less than said given sweep rate and greater than zero;
means operable to disable said sweep circuit at a selected received signal; and
means coupled to said device responsive to said selected signal to lock the frequency of said tuning circuit to the frequency of said selected signal.

14. A radio receiver comprising:
a tuning circuit including a voltage variable capacitor capable of tuning said receiver through a given frequency range;
a sweep circuit coupled to said capacitor to periodically tune said receiver through said frequency range at a given sweep rate; and
a signal detector coupled to said sweep circuit responsive to received signals to slow down said given sweep rate momentarily to a second sweep rate less than said given sweep rate and greater than zero.

15. A radio receiver comprising:
a mixer;
a local oscillator coupled to said mixer, said local oscillator being capable of being tuned to tune said receiver through a given frequency range;
means coupled to said local oscillator to periodically tune said local oscillator at a given tuning rate to tune said receiver through said given frequency range; and
means coupled to said means to tune responsive to said received signals to slow down said given rate momentarily to a second tuning rate less than said given rate and greater than zero.

16. A radio receiver comprising:
a mixer;
a local oscillator coupled to said mixer, said oscillator including a tuning circuit having a voltage variable device capable of tuning said receiver through a given frequency range;
a sweep circuit coupled to said device to periodically tune said receiver through said frequency range at a given sweep rate;
a signal detector coupled to said sweep circuit responsive to received signals to slow down said given sweep rate momentarily to a second sweep rate less than said given sweep rate and greater than zero;
means operable to disable said sweep circuit at a selected received signal; and
means coupled to said device responsive to said selected signal to lock the frequency of said tuning circuit to the frequency of said selected signal.

17. A radio receiver comprising:
a radio frequency amplifier including a tuning circuit having a first voltage variable device;
a mixer coupled to said amplifier, said mixer including a tuning circuit having a second voltage variable device;

a local oscillator coupled to said mixer, said oscillator including a tuning circuit having a third voltage variable device;

means coupled in common to each of said devices to periodically tune said receiver through a given frequency range at a given rate; and means coupled to said means to tune responsive to received signals to slow down the tuning rate momentarily.

18. A radio receiver comprising a signal channel tuneable through a given frequency range, means coupled to said channel for tuning said channel through said frequency range at a given tuning rate, said tuning means including means responsive to received signals for causing said tuning means to slow down said given rate momentarily to a second tuning rate less than said given rate and greater than zero.

19. A radio receiver comprising a signal channel tuneable through a given frequency range, a sweep circuit coupled to said channel for tuning said channel through said frequency range at a given rate, said sweep circuit including means including a variable impedance element responsive to received signals for slowing down said tuning rate.

20. A radio receiver according to claim 19 wherein said variable impedance element comprises a triode, and wherein said radio receiver further comprises a signal detector which produces a D.C. voltage proportional to the amplitude of received signals, said signal detector being coupled to the grid of said triode to vary the impedance of said triode in proportion to the amplitude of received signals.

21. A radio receiver according to claim 19 further comprising means for causing said sweep circuit to sweep at a minimum rate during the receipt of signals above a desired signal strength.

22. A radio receiver according to claim 21 wherein said means for causing said sweep circuit to sweep at said minimum rate comprises a resistor connected in parallel across said variable impedance.

References Cited by the Examiner

UNITED STATES PATENTS

| | | | |
|---|---|---|---|
| 2,243,921 | 6/41 | Rust et al. | 307—88.5 |
| 2,496,832 | 2/50 | Wallace | 325—471 |
| 2,906,875 | 9/59 | Molinaro | 325—470 |
| 2,977,465 | 3/61 | Sanders, Jr. | 325—332 |

DAVID G. REDINBAUGH, *Primary Examiner.*